US010764367B2

(12) United States Patent
Shea et al.

(10) Patent No.: US 10,764,367 B2
(45) Date of Patent: Sep. 1, 2020

(54) REGISTRATION WITH A STORAGE NETWORKING REPOSITORY VIA A NETWORK INTERFACE DEVICE DRIVER

(71) Applicant: HEWLETT PACKARD ENTERPRISE DEVELOPMENT LP, Houston, TX (US)

(72) Inventors: Daniel Shea, Andover, MA (US); Vivek Agarwal, Andover, MA (US); Krishna Puttagunta, Roseville, CA (US); Rupin T. Mohan, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 423 days.

(21) Appl. No.: 15/460,050

(22) Filed: Mar. 15, 2017

(65) Prior Publication Data
US 2018/0270308 A1    Sep. 20, 2018

(51) Int. Cl.
H04L 29/08      (2006.01)
H04L 12/911     (2013.01)
H04L 12/24      (2006.01)

(52) U.S. Cl.
CPC .......... H04L 67/1097 (2013.01); H04L 41/28 (2013.01); Y02D 30/30 (2018.01)

(58) Field of Classification Search
CPC .............. H04L 47/821; H04L 67/1097; H04L 12/2803; H04L 12/2818; H04L 12/2836; G06F 15/16; G06F 9/4416
USPC ........................................ 709/219, 220, 222
See application file for complete search history.

(56) References Cited

U.S. PATENT DOCUMENTS

| 7,360,072 | B1 | 4/2008 | Soltis et al. |
| 7,454,584 | B2 | 11/2008 | Mitsuoka et al. |
| 7,483,694 | B2 * | 1/2009 | Varanda ................. H04M 1/24 379/1.01 |
| 7,584,272 | B2 | 9/2009 | Spry |
| 7,747,847 | B2 | 6/2010 | El Zur et al. |
| 7,886,139 | B2 | 2/2011 | Hernandez et al. |
| 7,975,135 | B2 | 7/2011 | Reeves et al. |
| 8,140,657 | B2 | 3/2012 | Saklecha et al. |
| 8,209,704 | B1 | 6/2012 | McCann et al. |
| 8,903,982 | B2 | 12/2014 | Nagai et al. |

(Continued)

FOREIGN PATENT DOCUMENTS

| CN | 104767761 A | 7/2015 |
| CN | 106101131 A | 11/2016 |

OTHER PUBLICATIONS

Amr Enan, "FLOGI, PLOGI, and PRLI," Jun. 28, 2013, <http://blog.globalknowledge.com/2013/06/28/flogi-plogi-and-prli/>.

(Continued)

Primary Examiner — Tesfay Yohannes
(74) Attorney, Agent, or Firm — Hewlett Packard Enterprise Patent Department

(57) ABSTRACT

Examples include registration with a storage networking repository via a network interface device driver independent of a storage initiator. Some examples include registration with a storage networking repository, provision of a state change registration to the storage network device, and acquisition of login information for storage targets from the storage networking repository, each via a network interface device driver and independent of a storage initiator and a storage protocol driver.

18 Claims, 3 Drawing Sheets

(56) References Cited

U.S. PATENT DOCUMENTS

| | | | |
|---|---|---|---|
| 8,904,050 | B1 | 12/2014 | Raizen et al. |
| 9,003,000 | B2 | 4/2015 | Currid et al. |
| 9,519,595 | B1 | 12/2016 | Zeldin et al. |
| 2002/0069245 | A1* | 6/2002 | Kim ................. G06F 3/0605 709/203 |
| 2003/0236861 | A1 | 12/2003 | Johnson et al. |
| 2004/0049603 | A1 | 3/2004 | Boyd et al. |
| 2005/0138346 | A1 | 6/2005 | Cauthron |
| 2006/0218388 | A1 | 9/2006 | Zur et al. |
| 2007/0011704 | A1* | 1/2007 | Anglin, Jr. ......... H04N 7/17318 725/46 |
| 2007/0256080 | A1 | 11/2007 | Smith et al. |
| 2009/0201421 | A1* | 8/2009 | Mawatari ............ H04N 5/765 348/553 |
| 2009/0216866 | A1* | 8/2009 | Lu ..................... G06F 9/4416 709/222 |
| 2010/0146085 | A1* | 6/2010 | Van Wie ............. H04L 12/00 709/220 |
| 2010/0325274 | A1 | 12/2010 | Saklecha et al. |
| 2014/0149536 | A1 | 5/2014 | Patnaik et al. |
| 2014/0204957 | A1 | 7/2014 | Kanda et al. |
| 2014/0317313 | A1* | 10/2014 | Okita ................. H04L 41/12 709/245 |
| 2015/0200954 | A1* | 7/2015 | Gourlay ............. H04L 49/70 726/4 |
| 2015/0244536 | A1* | 8/2015 | Ma ................... H04L 12/40045 713/300 |
| 2015/0254088 | A1 | 9/2015 | Chou et al. |
| 2016/0124880 | A1 | 5/2016 | Goren et al. |
| 2016/0127493 | A1 | 5/2016 | Shalom et al. |
| 2017/0280173 | A1* | 9/2017 | Kure .................. H04L 47/748 |

OTHER PUBLICATIONS

Andy Banta, "Why SolidFire Uses iSCSI Storage Protocol," May 19, 2016, (web page), <https://www.solidfire.com/blog/why-solidfire-uses-iscsi-storage-protocol/>.
Broadcom, "Emulex® Drivers for VMware ESXi for OneConnect® Adapters," Dec. 30, 2016, Version 11.2, <https://docs.broadcom.com/docs-and-downloads/oem/support/ccx/rt11.2.1/11.2.1153.25/vmware_manual_ccx.pdf>.
Cisco Systems, Inc., "Installation notes for iSCSI Driver Version 3.2.0.5 for Linux," 2002, <http://linux-iscsi.sourceforge.net/README>.
Cisco, "Configuring iSCSI," Oct. 17, 2014, <http://www.cisco.com/c/en/us/td/docs/switches/datacenter/mds9000/sw/5_2/configuration/guides/ipsvc/DCNM-SAN/ipser/ciscsi.html>.
Dan Gookin, "How to Upgrade the Network Interface Card (NIC) Driver," Feb. 27, 2017, (web page), <http://www.dummies.com/computers/pcs/how-to-upgrade-the-network-interface-card-nic-driver/>.
DataCore, "Gathering Host Port Information," Feb. 21, 2017, <https://www.datacore.com/SSV-Webhelp/gathering_host_port_information.htm>.
DataCore, "Registering Hosts and Assigning Ports," Feb. 21, 2017, <https://www.datacore.com/SSV-Webhelp/Registering_Hosts_and_Assigning_Ports.htm>.
Dell Inc., "About Your Host" Dell™ PowerVault™ Modular Disk Storage Manager User's Guide, Oct. 2008,<http://ftp.respmech.com/pub/MD3000/en/MDSM_Users_Guide/host.htm>.
Hewlett Packard Enterprise Development LP, "HP StorageWorks Secure Path—Overview," 2016, (Web Page), <http://h20564.www2.hpe.com/hpsc/doc/public/display?docid=emr_na-c00339893#N104E1>.
IBM, "Configuring iSCSI software initiator," Feb. 27, 2017, <http://www.ibm.com/support/knowledgecenter/ssw_aix_71/com.ibm.aix.networkcomm/iscsi_config.htm>.
IBM, "iSCSI software initiator and software target," Feb. 27, 2017, <https://www.ibm.com/support/knowledgecenter/en/ssw_aix_71/com.ibm.aix.networkcomm/iscsi_intro.htm>.
IBM, "iSCSI software initiator considerations," Feb. 27, 2017, <https://www.ibm.com/support/knowledgecenter/en/ssw_aix_71/com.ibm.aix.networkcomm/iscsi_considerations.htm>.
Intel, "Quick Start User's Guide," Intel® Storage System SSR212PPi / SSR212PP2i, sections 7-12, 2006, <http://www.intel.com/content/dam/support/us/en/documents/motherboards/server/ssr212pp/sb/ssr212ppi_qsg_back.pdf>.
Jeff Hunter, "Connecting to an iSCSI Target with Open-iSCSI Initiator using Linux," Dec. 28, 2011, <http://www.idevelopment.info/data/Unix/Linux/LINUX_ConnectingToAniSCSITargetWithOpen-iSCSIInitiatorUsingLinux.shtml>.
Karthikeyan Sadhasivam, "15 EMC Navisphere CLI Command Examples with NaviSecCLI," Aug. 4, 2014 < http://www.thegeekstuff.com/2014/08/emc-naviseccli-navisphere-cli/>.
QLogic Corporation, "QLogic iSCSI Boot Software Initiator README," 2015, <ftp://ftp.supermicro.com/driver/Broadcom/B57BCMCD_T7.12b.4.1/dos/onchip_firmware/iscsi_boot/read me.txt>.
Red Hat, Inc., "iSCSI Initiator Creation," Storage Administration Guide, Red Hat Enterprise Linux 6.8, Feb. 21, 2017, <https://access.redhat.com/documentation/en-US/Red_Hat_Enterprise_Linux/6/html/Storage_Administration_Guide/iscsi-api.html>.
Red Hat, Inc., "Set up an iSCSI Target and Initiator," Storage Administration Guide, Red Hat Enterprise Linux 6.8, Feb. 21, 2017, <https://access.redhat.com/documentation/en-US/Red_Hat_Enterprise_Linux/6/html/Storage_Administration_Guide/ch-iscsi.html>.
SANsymphony, "Automatic Discovery of iSCSI Initiator/Targets using iSNS," Feb. 21, 2017, <http://sansymphony.helpmax.net/en/sansymphony-administration-help/configuration-controlsanmanager/sanmanager-tabs/configuring-iscsi/automatic-discovery-of-iscsi-initiatortargets-using-isns/>.
Satran et al., "Internet Small Computer Systems Interface (iSCSI)," Apr. 2004, <https://tools.ietf.org/pdf/rfc3720.pdf>.
Satran, J. et al., "Internet Small Computer Systems Interface (iSCSI)," Network Working Group, Request for Comments: 3720 (RFC 3720), Apr. 2004, 257 pages, available at https://tools.ietf.org/pdf/rfc3720.pdf.
Suman Pinnamaneni, "How to register host HBA initiators manually in a VNX array?," Mar. 12, 2013, <https://community.emc.com/docs/DOC-22645>.
Tseng et al., "Internet Storage Name Service (iSNS)," Sep. 2005, Network Working Group, Request for Comments: 4171, RFC 4171, <https://tools.ietf.org/pdf/rfc4171.pdf>.
Wikipedia, "Host adapter," Feb. 21, 2017, <https://en.wikipedia.org/w/index.php?title=Host_adapter&oldid=766700005>.
Wikipedia, "Internet Storage Name Service," Aug. 12, 2016, <https://en.wikipedia.org/w/index.php?title=internet_Storage_Name_Service&oldid=734176009>.
Wikipedia, "iSCSI," Dec. 5, 2016, <https://en.wikipedia.org/w/index.php?title=ISCSI&oldid=753179838>.
Wikipedia, "Link Layer Discovery Protocol," Aug, 5, 2016, <https://en.wikipedia.org/w/index.php?title=Link_Layer_Discovery_Protocol&oldid=733173101>.
Wikipedia, "Network interface controller," Feb. 23, 2017, <https://en.wikipedia.org/w/index.php?title=Network_interface_controller&oldid=767094722>.
Wikipedia, "SCSI initiator and target," Mar. 14, 2014, <https://en.wikipedia.org/w/index.php?title=SCSI_initiator_and_target&oldid=599549933>.
Wikipedia, "Universal Network Device Interface," Mar. 23, 2013, <https://en.wikipedia.org/w/index.php?title=Universal_Network_Device_Interface&oldid=546571621>.
Wikipedia, "Fibre Channel Logins," Dec. 26, 2015, <https://en.wikipedia.org/w/index.php?title=Fibre_Channel_Logins&oldid=695560215>.

* cited by examiner

REGISTRATION WITH A STORAGE NETWORKING REPOSITORY VIA A NETWORK INTERFACE DEVICE DRIVER

BACKGROUND

A computing device may store data locally in storage of the computing device itself. A computing device may also store data on storage resource(s) that are remote from the computing device and that are accessible over a computer network. In such examples, the computing device may operate as a client computing device of remote storage resource(s) and utilize a specific networking protocol or standard to store data to and retrieve data from the remote storage resource(s) via the computer network.

BRIEF DESCRIPTION OF THE DRAWINGS

The following detailed description references the drawings, wherein.

DETAILED DESCRIPTION

Figure 1:
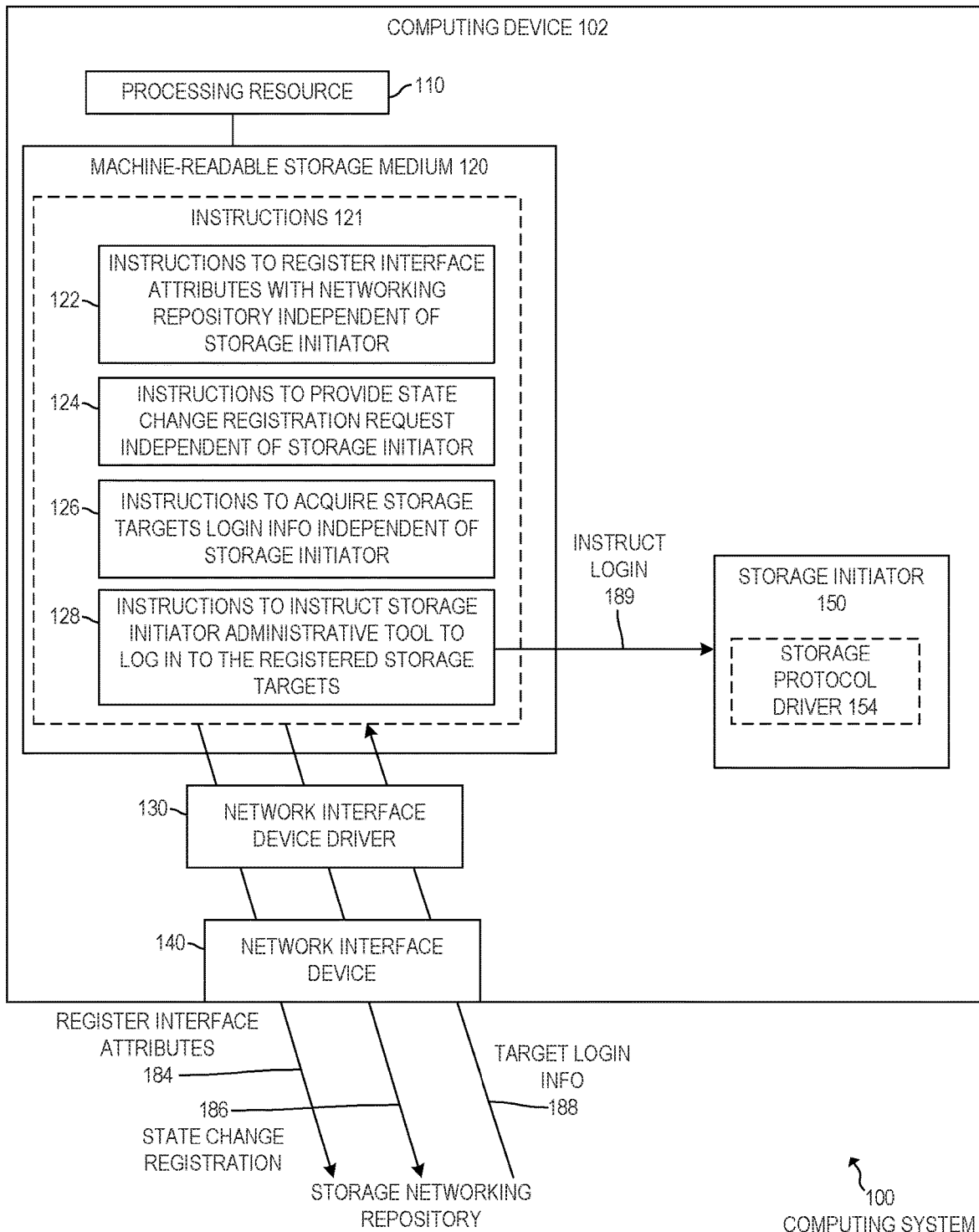
FIG. 1 is a block diagram of an example computing system including a computing device to register with a storage networking repository via a network interface device driver and independent of a storage initiator.

As noted above, a computing device may operate as a client computing device of remote storage resource(s) and utilize a specific networking protocol or standard to store data to and retrieve data from the remote storage resource(s) via a computer network such as, for example, a local area network (LAN), a virtual LAN (VLAN), a wireless local area network (WLAN), a virtual private network (VPN), the Internet, or the like, or a combination thereof.

In such examples, the client computing device may include a storage initiator to communicate with storage targets (i.e., the remote storage resources) over the computer network utilizing a networking protocol or standard such as, for example, the Internet Small Computer Systems Interface (iSCSI) protocol (or another suitable protocol or standard). Such a storage initiator may be implemented as a software storage initiator of the client computing device (e.g., implemented via machine-executable instructions), as a hardware device, or as a combination thereof.

Some storage initiators may not be able to retrieve certain configuration parameters before logging in to a storage target. Thus, use of such storage initiators may involve a user manually inputting parameters for storage target(s) in to the storage initiator in order for the storage initiator to log in to the storage target(s). Moreover, different storage initiators may have different internal architectures, making it cumbersome to supplement the functionalities of different storage initiators.

To address these issues, in examples described herein, a platform-agnostic storage initiator plug-in may supplement the functionalities of several different types of storage initiators by performing pre-login network communication on behalf of the storage initiator via a network interface device driver of a computing device, independent of the storage initiator and independent of a storage protocol driver used by the storage initiator. By using the network interface device driver independent of the storage protocol driver of the storage initiator, the plug-in may provide additional functionality for the storage initiator while bypassing the particularities of the internal architecture of the specific storage initiator. In this manner the plug-in functionalities may be provided for several different types of storage initiators (e.g., having different internal architectures).

For example, examples described herein may register interface attributes with a remote storage networking repository, provide a state change registration to the storage networking repository, and acquire login information for a plurality of storage targets from the storage networking repository, each via a network interface device driver to operate the network interface device, and independent of the storage initiator (including a storage protocol driver utilized by the storage initiator). In addition, in response to acquisition of the login information, examples described herein may provide the login information to the storage initiator and instruct the storage initiator to log in to the plurality of storage targets using the login information. In this manner, examples described herein may provide automated registration and login information acquisition for the storage initiator while the storage initiator is not logged in to any storage target (e.g., prior to any login to a storage target), and via the network interface device driver to bypass the internal architecture of particular storage initiator(s).

Referring now to the drawings, FIG. 1 is a block diagram of an example computing system 100 including a computing device 102 to register with a storage networking repository via a network interface device driver 130 and independent of a storage initiator 150. In the example of FIG. 1, computing device 102 may include at least one processing resource 110, and at least one machine-readable storage medium 120 comprising (e.g., encoded with) instructions 121 that are executable by the at least one processing resource 110 to implement functionalities described herein in relation to FIG. 1. Instructions 121 may include at least instructions 122, 124, 126, and 128, as shown in FIG. 1. In some examples, a plug-in application (e.g., "storage initiator plug-in" or "plug-in" herein) separate from a storage initiator 150 and for storage initiator 150 of computing device 102 may be implemented by instructions 121 (including at least instructions 122, 124, 126, and 128).

In the example of FIG. 1, computing device 102 may include a network interface device 140 and a network interface device driver 130. In examples described herein, the network interface device 140 may be implemented by any suitable hardware device to perform communication via at least one computer network, such as a network interface controller (NIC), network interface card, network adapter, host bus adapter, Ethernet adapter, or the like. In examples described herein, the network interface device driver 130 may comprise machine-readable instructions executable by processing resource 110 to operate network interface device 140 to communicate on at least one computer network. In examples described herein, a network interface device driver may natively operate a network interface device of a computing device using the Internet Protocol Suite (e.g., TCP/IP). In some examples, a network interface device driver may be useable by many different functions of an operating system (OS) of a computing device including the network interface device driver, including functions not related to network storage. In examples described herein, machine-readable instructions implementing network interface device driver 130 may be stored in storage of computing device 102, such as machine-readable storage medium 120, or any other machine-readable storage medium of computing device 102.

In the example of FIG. 1, computing device 102 may include a storage initiator 150 that may be implemented in hardware, implemented by machine-readable instructions executable by a processing resource of computing device 102 (e.g., implemented in software), or a combination thereof. In some examples, storage initiator 150 may be a "software" storage initiator implemented by machine-readable instructions executable by a processing resource of computing device 102. In such examples, the instructions implementing storage initiator 150 may be stored in storage of computing device 102, such as a machine-readable storage medium of computing device 102 (e.g., storage medium 120, or another machine-readable storage medium of computing device 102).

In some examples, storage initiator 150 may be associated with a storage protocol driver, such as a storage protocol driver 154, that it may utilize to perform communications related to network storage. In examples described herein, a storage initiator 150 that utilizes a storage protocol driver 154 may include the storage protocol driver as part of the storage initiator 150. In examples described herein, a storage protocol driver may be a driver operable to communicate on at least one computer network by natively utilizing a particular networking protocol or standard (e.g., iSCSI, etc.) that is natively utilized or supported by storage initiator(s) and storage target(s) and that is not natively utilized by a separate network interface device driver for a network interface device (e.g., of the same computing device). For example, in examples described herein, a storage protocol driver (e.g., storage protocol driver 154) may be an iSCSI driver operable to natively utilize iSCSI to perform network communications, whereas a network interface device driver (network interface device driver 130) of the same computing device may natively utilize TCP/IP (for example) but may not have native capabilities to communicate using iSCSI. In some examples, a network interface device driver may be a component of an OS of a computing device, and the network interface device driver may be part of the OS and be used by the OS to communicate on a network interface device of the computing device to perform functions not related to network storage. In such examples, a storage protocol driver may be included in a storage initiator of a computing device, utilized exclusively by the storage initiator, or not used by an OS of the computing device for any function not related to network storage, or a combination thereof.

In some examples, storage protocol driver 154 may be implemented by machine-readable instructions executable by a processing resource of computing device 102, and may be stored on a machine-readable storage medium of computing device 102. In some examples, storage initiator 150 may be associated with storage protocol driver 154 such that storage initiator 150 may utilize storage protocol driver 154 to perform communication, via at least one computer network using network interface device 140, using a storage networking protocol or standard (e.g., iSCSI, etc.). In some examples, storage initiator 150 may include storage protocol driver 154, such as in examples in which storage initiator 150 is implemented as a software storage initiator as described above.

In the example of FIG. 1, a storage networking repository may be included in (e.g., implemented in) a storage network device that is remote from computing device 102 and accessible to computing device 102 via at least one computer network. In such examples, computing device 102 may communicate with the storage networking repository using network interface device 140. In examples described herein, the storage networking repository may be any suitable repository (e.g., database(s), etc.) accessible to storage clients (e.g., initiators) and storage targets to store and retrieve information related to the storage clients and storage targets. In the example of FIG. 1, instructions 121, when executed by processing resource 110, may communicate with the storage networking repository remote from computing device 102 via network interface device driver 130 and network interface device 140. In some examples, the storage network device including (e.g., implementing the storage networking repository) may be a computing device such as a network switch or a server, as described below in relation to FIG. 2.

For example, instructions 121 may perform a repository access process to register information to and acquire information from the storage networking repository, as described below in relation to instructions 121. In such examples, in the repository access process, instructions 121 may communicate with the storage networking repository via network interface device driver 130 and network interface device 140, and may communicate with the storage networking repository independent of storage initiator 150 and any storage protocol driver utilized by storage initiator 150 (e.g., storage protocol driver 154 included in storage initiator 150). For example, instructions 121 may communicate with the storage networking repository via network interface device driver 130 and network interface device 140 without using storage initiator 150 or any storage protocol driver used by storage initiator 150 (e.g., storage protocol driver 154 included in storage initiator 150) to perform any aspect of the communications. In some examples, instructions 121 may perform the repository access process while storage initiator 150 is not logged in to any storage target (e.g., before storage initiator 150 has logged in to any storage target). In examples described herein in relation to FIG. 1, instructions may be described as performing communication independent of storage initiator 150 and storage protocol driver 154 included in storage initiator 150. In other examples, the instructions may perform those communications independent of storage initiator 150 and any storage protocol driver included in storage initiator 150 or useable as an interface between storage initiator 150 and network interface device 140.

Examples of the repository access process are described below in relation to instructions 121. In the example of FIG. 1, while storage initiator 150 is not logged in to any storage target (e.g., before storage initiator 150 has logged in to any storage target), instructions 122 may register 184 interface attributes with the remote storage networking repository via network interface device driver 130 (to operate network interface device 140) and independent of storage initiator 150 and storage protocol driver 154 included in storage initiator 150. In examples described herein, interface attributes may be attributes associated with a network interface device. In examples described herein, registration of interface attributes may include registration of attributes associated with a network interface device (as described herein), registration of port attributes associated with a port of a network interface device (as described herein), or both. In some examples, registration of interface attributes associated with a network interface device may be referred to as registration of the network interface device.

In some examples, instructions 122 to register 184 interface attributes may register attributes associated with network interface device 140 with the storage networking repository, via network interface device driver 130 (and network interface device 140) and independent of storage initiator 150 and storage protocol driver 154 included in storage initiator 150. In such examples, instructions 122 registering 184 the attributes may cause the attributes to be stored in the remote storage networking repository such that they are accessible to other devices able to access the storage networking repository via at least one computer network.

In some examples, the attributes associated with network interface device 140 that instructions 122 may register 184 with the storage networking repository may include, for example, one or more of a network interface device identifier (e.g., an iSCSI node name associated with storage initiator 150, iSCSI qualified name (IQN), a host bus adapter identifier (HBA ID), etc.), network interface device manufacturer information, a network interface device serial number, a network interface device model identifier, a network interface device model description, a network interface device hardware version identifier, associated software identifier(s) (e.g., associated driver version identifier, associated firmware version identifier, etc.), network interface device port identifier(s) (e.g., machine address(es) (MAC address(es) of the port(s)), or the like, or a combination thereof. In other examples, instructions 122 may register 184 attributes associated with another network interface device of computing device 102 (e.g., a hardware device different than and separate from network interface device 140). For example, instructions 122 may register 184 attributes associated with a storage adapter (e.g., a hardware storage adapter), such as an iSCSI adapter (i.e., a hardware adapter) to be used by a storage initiator (e.g., storage initiator 150) for storage communications, for example. In some examples, the attributes associated with the other network interface device (e.g., the storage adapter, etc.) and registered by instructions 122 may be any of the types of attributes described above in relation to network interface device 140, such as, for example, one or more of a network interface device identifier (e.g., an iSCSI node name associated with storage initiator 150, IQN, a host bus adapter identifier (HBA ID), etc.), network interface device manufacturer information, a network interface device serial number, a network interface device model identifier, a network interface device model description, a network interface device hardware version identifier, associated software identifier(s) (e.g., associated driver version identifier, associated firmware version identifier, etc.), network interface device port identifier(s) (e.g., machine address(es) (MAC address(es) of the port(s)), or the like, or a combination thereof.

In some examples, instructions 122 to register 184 interface attributes may register port attributes of a port of network interface device 140 (or another network interface device), via network interface device driver 130 (and network interface device 140) and independent of storage initiator 150 and storage protocol driver 154 included in storage initiator 150. For example, in response to an acknowledgement from the storage network device including the storage networking repository that the attributes associated with the network interface device are registered with the storage networking repository, instructions 122 may register 184 port attributes of a port of the same network interface device whose attributes were previously registered with the storage networking repository by instructions 122 (e.g., network interface device 140 or another network interface device). In such examples, instructions 122 may register these port attributes via network interface device driver 130 and independent of storage initiator 150 and storage protocol driver 154 included in storage initiator 150. In such examples, instructions 122 registering 184 the port attributes may cause the port attributes to be stored in the remote storage networking repository such that they are accessible to other devices able to access the storage networking repository via at least one computer network.

In some examples, the port attributes associated with the network interface device that instructions 122 may register 184 with the storage networking repository may include, for example, one or more of a network interface device identifier (e.g., an iSCSI node name associated with storage initiator 150, an iSCSI qualified name (IQN), a host bus adapter identifier (HBA ID), etc.), a host name (e.g., associated with computing device 102), a portal Internet protocol (IP) address (e.g., an iSCSI portal IP address), port identifier(s) (e.g., an iSCSI TCP or UDP port identifier), an authentication method identifier, port speed information, a maximum frame size (MTU), information identifying an operating system (OS) of computing device 102 (e.g., at least one of an OS name, OS version, etc.), or the like, or a combination thereof.

In the example of FIG. 1, while storage initiator 150 is not logged in to any storage target (e.g., before storage initiator 150 has logged in to any storage target), instructions 124 may provide, to the storage network device implementing the storage networking repository, a state change registration 186 specifying when to notify computing device 102 of network changes. In such examples, instructions 124 may provide state change registration 186 to the storage network device including the storage networking repository via network interface device driver 130 (to operate network interface device 140) and independent of storage initiator 150 and storage protocol driver 154 included in storage initiator 150. In such examples, instructions 124 providing state change registration 186 to the storage network device including the storage networking repository may cause appropriate data to be stored in the storage networking repository (e.g., by the storage network device) to cause computing device 102 to be notified (e.g., by the storage network device) when the specified network change occur. In some examples, the state change registration 186 may include an identifier associated with computing device 102 (e.g., an iSCSI node name associated with storage initiator 150, an IQN, etc.), and information specifying when to notify computing device 102 of network changes (i.e., specifying the particular change or types of changes to notify computing device 102 about, etc.), which information may take any suitable format.

For example, in response to an acknowledgement from the storage network device that the port attributes are registered with the storage networking repository, instructions 124 may provide state change registration 186 to the storage network device including the storage networking repository, via network interface device driver 130 and independent of storage initiator 150 and storage protocol driver 154 included in storage initiator 150.

In the example of FIG. 1, while storage initiator 150 is not logged in to any storage target (e.g., before storage initiator 150 has logged in to any storage target), instructions 126 may acquire, from the remote storage networking repository, login information 188 for a plurality of storage targets registered with the storage networking repository. In such examples, instructions 126 may acquire the login information from the storage networking repository via network interface device driver 130 (to operate network interface device 140) and independent of storage initiator 150 and storage protocol driver 154 included in storage initiator 150. In such examples, instructions 126 may acquire login information 188 (via network interface device driver 140 and independent of storage initiator 150) in any suitable manner. For example, instructions 126 may retrieve login information 188 from the storage networking repository, or request and receive the login information 188 from the storage network device including the storage networking repository, or the like.

In some examples, instructions 126 may acquire login information 188 for the plurality of storage targets in response to acquiring an acknowledgement of the state change registration 186 from the storage network device. In some examples, instructions 126 may acquire login information 188 for the plurality of storage targets in response to acquiring a state change notification from the storage network device (based on the previously provided state change registration 186). In some examples, instructions 126 may acquire login information 188 for the plurality of storage targets in response to either of acquiring the acknowledgement of the state change registration 186 or acquiring a state change notification from the storage network device (based on the state change registration 186). In some examples, the login information 188 may include, for each of the plurality of storage targets, at least one of an identifier for the target (e.g., a storage protocol specific identifier, such as an IQN of the target), an IP address of the target, a port identifier for the target, an authentication method to use with the target, or the like, or a combination thereof.

In the examples described herein, instructions 121 may register 184 interface attributes and acquire login information 188 (e.g., perform the above-noted repository access process), as described above in relation to instructions 122, 124, and 126. In such examples, instructions 121 may register 184 the interface attributes and acquire login information 188 such that each communication between instructions 121 and the storage network device (including the storage networking repository) in that process is performed via network interface device driver 130 for network interface device 140, and independent of storage initiator 150 and storage protocol driver 154 included in storage initiator 150. In some examples, the repository access process may include the functionalities described above in relation to instructions 122, 124, and 126. In such examples, each of the above-described communications between instructions 121 and the storage network device including the storage networking repository being performed by instructions 121 via network interface device driver 130 for network interface device 140, and independent of storage initiator 150 and storage protocol driver 154 included in storage initiator 150.

In the example of FIG. 1, in response to acquisition of login information 188, instructions 128 may provide login information 188 to storage initiator 150 and instruct 189 storage initiator 150 to log in to the plurality of storage targets using login information 150. For example, instructions 128 may provide login information 188 to an administrative tool of storage initiator 150 and instruct 189 the administrative tool of storage initiator 150 to log in to the storage targets using login information 188. In some examples, instructions 128 may provide the login instruction 189 and the login information 188 to the storage initiator 150 (e.g., to an administrative tool of the storage initiator 150) via an application programming interface (API) of the storage initiator 150 (or of the administrative tool). The instruction 189 to login to the plurality of storage targets may be a command or any other communication to indicate to or cause the storage initiator 150 to log in to the storage targets. In some examples, instructions 128 may provide the instruction 189 to log in and the login information 188 to the storage initiator 150 (e.g., to the administrative tool) in a single communication or in a plurality of different communications.

In some examples, in response to receiving the login instruction 189 and the login information 188, storage initiator 150 may log in to each of the plurality of storage targets using the respective portion of the login information 188 for each respective storage target. In some examples, storage initiator 150 may utilize a storage protocol driver 154 to log in to each of the plurality of storage targets via network interface device 140.

In some examples, network interface device 140 may be a NIC, and network interface device driver 130 may be a NIC driver to control the NIC 140. In some examples, storage initiator 150 may be an iSCSI initiator, and storage protocol driver 154 may comprise an iSCSI driver 154 of iSCSI initiator 150.

As noted above, in some examples, instructions 121 (including at least instructions 122, 124, 126, and 128) may implement a plug-in application for storage initiator 150. In some examples, instructions 121 may be included in a plug-in executable entirely or at least partially in kernel space of computing device 102 (e.g., in kernel space of an OS of computing device 102). In some examples, instructions 121 may be included in a plug-in executable entirely or at least partially in user space of computing device 102 (e.g., in user space of an OS of computing device 102).

In some examples, instructions 121 may implement a command line utility for the plug-in. In such examples, instructions 122 may receive, from the command line utility of the plug-in, a request to enable a given port of a network interface device (e.g., network interface device 140 or another network interface device, as described above), wherein the port is specified via the command line utility. In such examples, in response to the request to enable the given port, instructions 122 may register 184 the network interface device including the given port with the storage networking repository (e.g., register attributes associated with the network interface device including the given port, and register port attributes of the given port of the network interface device, as described above), instructions 124 may provide the state change registration 186 to the storage network device including the storage networking repository (as described above), and instructions 126 may acquire the login information 188 for the plurality storage targets (as described above). In some examples, the command line utility may be implemented by instructions 121 when the plug-in is implemented at least partially in user space of an OS of computing device 102. In some examples, the port of network interface device 140 may be an Ethernet port of the network interface device 140.

As used herein, a "computing device" may be a server, desktop or laptop computer, controller, microcontroller, integrated circuit, enclosure (e.g., storage enclosure), switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

In examples described herein, the at least one processing resource 110 may fetch, decode, and execute instructions stored on storage medium 120 to perform the functionalities described above in relation to instructions stored on storage medium 120. In other examples, the functionalities of any of the instructions of storage medium 120 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In other examples, the functionalities described above in relation to instructions of medium 120 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device at least partially implementing computing system 100 may include the at least one machine-readable storage medium storing the instructions and the at least one processing resource to execute the instructions. In other examples, the engines may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard-disk drive), a solid-state drive (SSD), any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions of medium 120 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions of medium 120 may be part of an application, applications, or component(s) already installed on a computing device of computing system 100 including processing resource 110. In such examples, the storage medium 120 may include memory such as a hard-disk drive, solid-state drive, non-volatile memory device, or the like. In some examples, functionalities described herein in relation to FIG. 1 may be provided in combination with functionalities described herein in relation to any of FIGS. 2-4.

Figure 2:
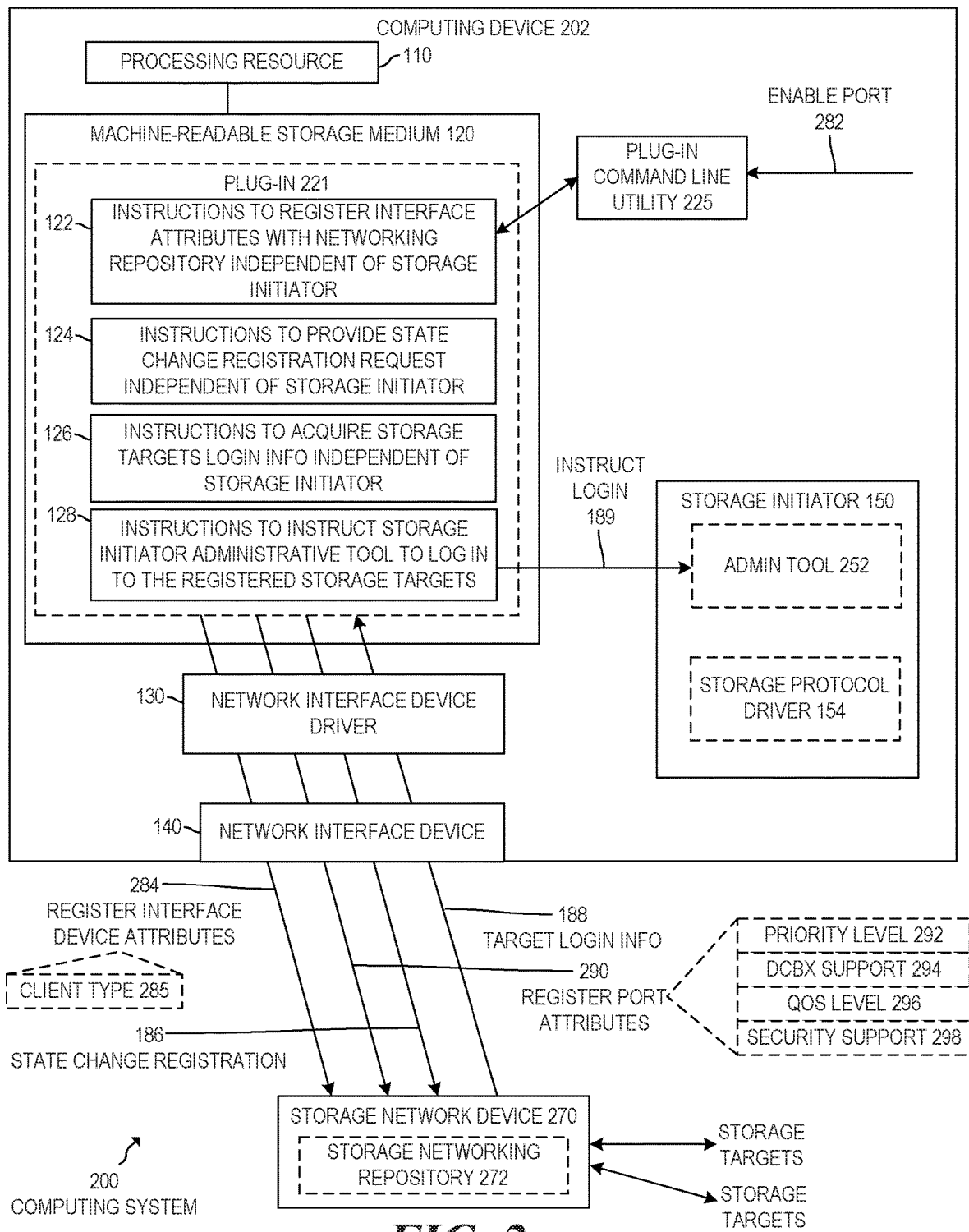
FIG. 2 is a block diagram of an example computing system including a computing device having a storage initiator and a plug-in for the storage initiator to register with a storage networking repository independent of the storage initiator.

FIG. 2 is a block diagram of an example computing system 200 including a computing device 202 having a storage initiator 150 and a plug-in 221 for the storage initiator to register with a storage networking repository 272 independent of storage initiator 150. In the example of FIG. 2, computing device 202 may include at least one processing resource 110, and at least one machine-readable storage medium 120 comprising (e.g., encoded with) instructions, as described above. In the example of FIG. 2, storage medium 120 may include a plug-in 221 implemented by instructions stored on storage medium 120 and executable by processing resource 110. The instructions of plug-in 221 may include at least instructions 122, 124, 126, and 128, which are executable by the at least one processing resource 110 to implement functionalities described herein in relation to instructions 122, 124, 126, and 128. In some examples, plug-in 221 may be a plug-in application for storage initiator 150 of computing device 102.

In the example of FIG. 2, computing device 202 may include a network interface device 140 and a network interface device driver 130, each as described above in relation to FIG. 1. In some examples, computing device 202 may include a storage initiator 150 that may be implemented in hardware, implemented by machine-readable instructions executable by a processing resource of computing device 202 (e.g., implemented in software), or a combination thereof, as described above in relation to FIG. 1.

In some examples, storage initiator 150 may be associated with a storage protocol driver 154, as described above. The storage protocol driver 154 may be separate from (i.e., a different driver than) the network interface device driver 130. In some examples, storage protocol driver 154 may be implemented by machine-readable instructions executable by a processing resource of computing device 202, and may be stored on a machine-readable storage medium of computing device 202. In some examples, storage initiator 150 may be associated with storage protocol driver 154 such that storage initiator 150 may utilize storage protocol driver 154 to perform communication, via at least one computer network using network interface device 140, utilizing a particular networking protocol or standard (e.g., iSCSI, etc.) that is natively utilized or supported by storage initiator(s) and storage target(s). In some examples, storage initiator 150 may include storage protocol driver 154 to interface between storage initiator 150 and network interface device 140.

In the example of FIG. 2, a storage networking repository 272 may be included in (e.g., implemented in) a storage network device 270 that is remote from computing device 202 and accessible to computing device 202 via at least one computer network. In such examples, computing device 202 may communicate with the storage networking repository using network interface device 140. Storage networking repository 272 may be any suitable repository (e.g., database(s), etc.) accessible to storage clients (e.g., initiators) and storage targets to store and retrieve information related to the storage clients and storage targets. In examples described herein, a storage network device may be any suitable computing device able to implement the storage networking repository and make the storage networking repository accessible to other remote computing devices over at least one computer network. In examples described herein, a storage network device may be a network switch including (e.g., implementing) a storage networking repository. In such examples, the network switch may comprise a server to implement functionalities related to the storage networking repository. In other examples, a storage network device may be a server including (e.g., implementing) the storage networking repository and to implement functionalities related to the storage networking repository.

In the example of FIG. 2, storage network device 270 may be a network switch or a server remote from computing device 202 that includes the storage networking repository 272 and may implement functionalities related to storage networking repository (e.g., facilitate storing information to and accessing information in storage networking repository 272).

In the example of FIG. 2, plug-in 221 may perform a repository access process to register information to and acquire information from the storage networking repository (as described above in relation to instructions 121). In such examples, in the repository access process, plug-in 221 may communicate with storage network device 270 (including storage networking repository 272) via network interface device driver 130 and network interface device 140, and may communicate with storage network device 270 (including storage networking repository 272) independent of storage initiator 150 and storage protocol driver 154 included in storage initiator 150. For example, plug-in 221 may communicate with storage network device 270 (including storage networking repository 272) via network interface device driver 130 and network interface device 140 without using storage initiator 150 or any storage protocol driver used by storage initiator 150 (e.g., storage protocol driver 154) to perform any aspect of the communications. In some examples, plug-in 221 may perform the repository access process while storage initiator 150 is not logged in to any storage target (e.g., before storage initiator 150 has logged in to any storage target). In some examples, the repository access process may include registering interface attributes (e.g., registering attributes of a network interface device such as network interface device 140) with storage networking repository 272, providing state change request 186 to storage network device 270 (including storage networking repository 272), and acquiring login information 188 from storage networking repository 272, as described herein in relation to instructions 122, 124, and 126, for example. In examples described herein in relation to FIG. 2, instructions may be described as performing communication independent of storage initiator 150 and storage protocol driver 154 included in storage initiator 150. In other examples, the instructions may perform those communications independent of storage initiator 150 and any storage protocol driver included in storage initiator 150 or useable as an interface between storage initiator 150 and network interface device 140.

In the example of FIG. 2, plug-in 221 may implement a command line utility 225 for the plug-in 221. In such examples, instructions 122 may receive, via command line utility 225 of plug-in 221, a request 282 to enable a given port of a given network interface device, wherein the port is specified via the command line utility. In some examples, the request 282 may be received while storage initiator 150 is not logged in to any storage target (e.g., before storage initiator 150 has logged in to any storage target).

In some examples, while storage initiator 150 is not logged in to any storage target (e.g., before storage initiator 150 has logged in to any storage target) and in response to the request 282 to enable the given port, instructions 122 may register 284 a network interface device including the given port (e.g., network interface device 140 or another network interface device, as described above), with remote storage networking repository 272 via network interface device driver 130 (to operate network interface device 140) and independent of storage initiator 150 and storage protocol driver 154 included in storage initiator 150, as described above in relation to FIG. 1. For example, instructions 122 to register 284 a network interface device may register attributes associated with network interface device 140 with the storage networking repository, via network interface device driver 130 (and network interface device 140) and independent of storage initiator 150 and storage protocol driver 154 included in storage initiator 150, as described above in relation to FIG. 1. In such examples, instructions 122 may register at least network interface device attributes and port attributes, as described below, via network interface device 130, independent of storage initiator 150 and storage protocol driver 154 included in storage initiator 150, and while storage initiator 150 is not logged in to any storage target. In examples described herein, registration of a network interface device may include registration of attributes associated with the network interface device (as described herein), registration of port attributes associated with a port of the network interface device (as described herein), or both.

For example, in response to request 282, instructions 122 may register 284 attributes of network interface device 140 (including the specified port) with storage networking repository 272, and may register, with storage networking repository 272, a client type attribute 285 to indicate whether computing device 202 including network interface device 140 is a storage network control node (e.g., a node that can perform control functions, such as modifying zoning, or the like). In such examples, instructions 122 may register 284 the network interface device attributes and the client type attribute 285, including causing those attributes to be stored in the remote storage networking repository 272 such that they are accessible to other devices able to access storage networking repository 272 via at least one computer network. In the example of FIG. 2, instructions 122 may perform the communications with storage network device 270 to register 284 the network interface device attributes and the client type attribute 285 via network interface device driver 130 independent of storage initiator 150 and storage protocol driver 154 included in storage initiator 150. In some examples, a storage initiator may not have the native ability to register the client type attribute 285, and plug-in 221 may supplement the functionalities of the storage initiator by registering this additional information with storage networking repository 272 via network interface device 130 (and independent of storage initiator 150 and any storage protocol driver it utilizes).

In some examples, in response to an acknowledgement from storage network device 270 that the network interface device attributes are registered with the storage networking repository 272, instructions 122 may register 290 port attributes of a port of network interface device 140, via network interface device driver 130 (and network interface device 140) and independent of storage initiator 150 and storage protocol driver 154 included in storage initiator 150, as described above in relation to FIG. 1. For example, instructions 122 may register 290 port attributes of the given port specified in the request 282. In some examples, instructions 122 registering 290 the port attributes may cause the port attributes to be stored in the remote storage networking repository 272 such that they are accessible to other devices able to access the storage networking repository 272 via at least one computer network.

In some examples, the port attributes registered by instructions 122 may include any of the port attributes described above in relation to FIG. 1. In some examples, the port attributes registered by instructions 122 may include at least one of a priority level 292, data center bridging capabilities exchange protocol (DCBX) support information 294, a quality of service support level 296, a security support level 298, or any of the port attributes described above in relation to FIG. 1, or a combination thereof. In some examples, the priority level may include a class of service (CoS) priority in the Ethernet frame header (e.g., of levels 1-7), DCBX support information may indicate support for a DCBX protocol (i.e., to exchange lossless Ethernet parameters), a quality of service support level may indicate a quality of level supported (e.g., high, medium, low, etc.), and a security support level may indicate a security level supported (e.g., tier-1, tier-2, tier-3, etc.). In some examples, a storage initiator may not have the native ability to register one or more of a priority level, DCBX support information, a quality of service support level, or a security support level, and plug-in 221 may supplement the functionalities of the storage initiator by registering this additional information with storage networking repository 272 via network interface device 130 (and independent of storage initiator 150 and any storage protocol driver it utilizes). Although the example of FIG. 2 has been described herein in relation to registration of attributes associated with network interface device 140, in other examples, instructions 122 may, via network interface device 140 and network interface device driver 130, register attributes of another network interface device of computing device 202, such as a hardware storage adapter (e.g., a hardware iSCSI adapter, etc.) separate from network interface device 140, as described above in relation to FIG. 1.

In some examples, while storage initiator 150 is not logged in to any storage target (e.g., before storage initiator 150 has logged in to any storage target) and in response to an acknowledgement from storage network device 270 that port attributes 290 are registered with storage networking repository 272, instructions 124 may provide a state change registration 186 to the storage network device 270 including storage networking repository 272, via network interface device driver 130 and independent of storage initiator 150 and storage protocol driver 154 included in storage initiator 150, as described above in relation to FIG. 1. For example, state change registration 186 may specify when to notify computing device 202 of network changes, as described above. In such examples, instructions 124 may provide state change registration 186 to storage network device 270, as described above, via network interface device driver 130 (to operate network interface device 140), independent of storage initiator 150 and storage protocol driver 154 included in storage initiator 150, and while storage initiator 150 is not logged in to any storage target. In some examples, instructions 124 providing state change registration 186 to storage network device 270 including storage networking repository 272 may cause storage network device 270 to store appropriate data in storage networking repository 272 such that storage network device 270 may notify computing device 202 when specified network change(s) occur.

In the example of FIG. 2, while storage initiator 150 is not logged in to any storage target (e.g., before storage initiator 150 has logged in to any storage target), instructions 126 may acquire, from remote storage networking repository 272, login information 188 for a plurality of storage targets registered with storage networking repository 272, as described above in relation to FIG. 1. In such examples, instructions 126 may acquire login information 188 from storage networking repository 272 via network interface device driver 130 (to operate network interface device 140) and independent of storage initiator 150 and storage protocol driver 154 included in storage initiator 150. In some examples, instructions 126 may acquire (e.g., retrieve) login information 188 from storage networking repository 272 in response to either of acquiring an acknowledgement of state change registration 186 from storage network device 270 or acquiring a state change notification from storage network device 270 (based on state change registration 186), as described above.

In some examples, while storage initiator 150 is not logged in to any storage target (e.g., before storage initiator 150 has logged in to any storage target) and in response to acquisition of login information 188, instructions 128 may provide login information to storage initiator 150 and instruct 189 storage initiator 150 to log in to the plurality of storage targets using login information 188, as described above. For example, instructions 128 may provide login information 188 to an administrative tool 252 of storage initiator 150 and instruct 189 administrative tool 252 of storage initiator 150 to log in to the storage targets using login information 188. In some examples, instructions 128 may provide the login instruction 189 and the login information 188 to the storage initiator 150 (e.g., to administrative tool 252) via an API of storage initiator 150. The instruction 189 to login to the plurality of storage targets may be a command or any other communication to indicate to or cause the storage initiator 150 to log in to the storage targets. In some examples, instructions 128 may provide the instruction 189 to log in and the login information 188 to the storage initiator 150 (e.g., to administrative tool 252) in a single communication or in a plurality of different communications. In some examples, in response to receiving the login instruction 189 and login information 188, storage initiator 150 may log in to each of the plurality of storage targets using the respective portion of the login information 188 for each respective storage target. In some examples, storage initiator 150 may utilize a storage protocol driver 154 to log in to each of the plurality of storage targets via network interface device 140.

In the examples described herein, plug-in 221 may register interface attributes (e.g., register network interface device 140) and acquire login information 188 (e.g., perform the above-noted repository access process) prior to providing the login information 188 to storage initiator 150 to use, as described above in relation to instructions 122, 124, and 126. In such examples, plug-in 221 may register the interface attributes (e.g., register network interface device 140) and acquire the login information 188 such that each communication between plug-in 221 and storage network device 270 (including storage networking repository 272) in that process is performed via network interface device driver 130 for network interface device 140, independent of storage initiator 150 and storage protocol driver 154 included in storage initiator 150.

In some examples, plug-in 221 may perform the above-described communications with storage network device 270 using link layer discovery protocol (LLDP) frame communicated via network interface device driver 130 and without using storage initiator 150 or storage protocol driver 154 of storage initiator 150. For example, instructions 122 may register interface attributes (e.g., register a network interface device, such as network interface device 140) with storage networking repository 272, instructions 124 may provide state change registration 186 to storage network device 270 including storage networking repository 272, and instructions 126 may acquire login information 188 from storage networking repository 272, as described above, each using at least one LLDP frame communicated via network interface device driver 130 and independent of storage initiator 150 and storage protocol driver 154 included in storage initiator 150.

In other examples, storage network device 270 may comprise an Internet Storage Name Service (iSNS) server to implement storage networking repository 272. In such examples, instructions 122 may register interface attributes (e.g., register a network interface device, such as network interface device 140) with storage networking repository 272 of the iSNS server, instructions 124 may provide state change registration 186 to storage network device 270 including storage networking repository 272 of the iSNS server, and instructions 126 may acquire login information 188 from storage networking repository 272 of the iSNS server, each via network interface device driver 130 and without using storage initiator 150 or storage protocol driver 154 of storage initiator 150.

In some examples, the functionalities described above in relation to plug-in 221 may be implemented by one or more engines which may be any combination of hardware and programming to implement the functionalities of the engine(s), as described above. In some examples, functionalities described herein in relation to FIG. 2 may be provided in combination with functionalities described herein in relation to any of FIGS. 1, 3, and 4.

Figure 3:
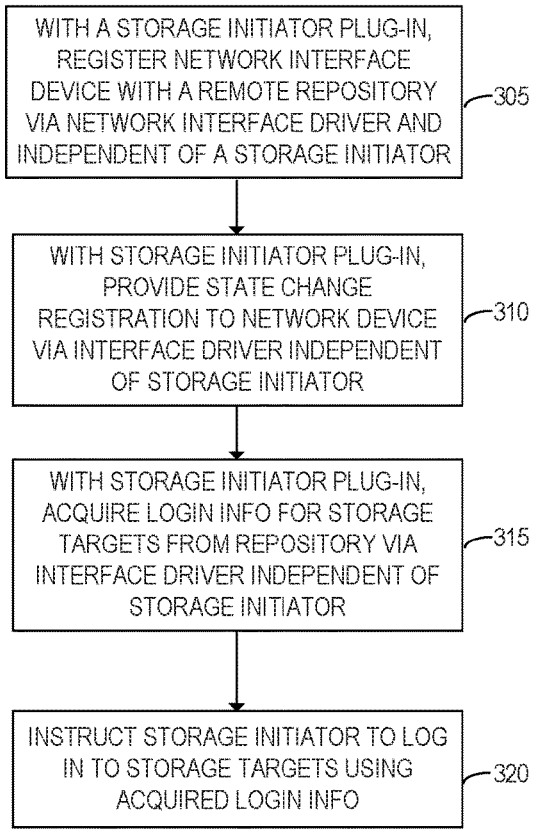
FIG. 3 is a flowchart of an example method of a computing system including registering with a storage networking repository via a network interface device driver and independent of a storage initiator.

FIG. 3 is a flowchart of an example method 300 of a computing system including registering with a storage networking repository via a network interface device driver and independent of a storage initiator. Although execution of method 300 is described below with reference to computing system 100 of FIG. 1, other suitable systems for the execution of method 300 may be utilized (e.g., computing system 200 of FIG. 2). Additionally, implementation of method 300 is not limited to such examples.

In some examples, a storage initiator plug-in application separate from a storage initiator of a computing device may implement method 300. For example, the plug-in application may be implemented by instructions 121 (e.g., including instructions 122, 124, 126, and 128) of computing device 102 of FIG. 1, and the instructions implementing the plug-in may be executable by at least one processing resource 110 of computing device 102. In such examples, instructions 121 (including instructions 122, 124, 126, and 128), when executed by the at least one processing resource 110, may perform method 300, as described below. In some examples, the plug-in application may be separate from a storage initiator 150 of computing device 102 and may supplement the functionalities of the storage initiator 150.

At 305 of method 300, instructions 122, when executed by the at least one processing resource 110, may register network interface device 140 of computing device 102 with a storage networking repository of a storage network device remote from computing device 102, as described above. In such examples, instructions 122 may register network interface device 140 of computing device 102 with the storage networking repository via a network interface device driver 130 to operate network interface device 140, and independent of storage initiator 150 including storage protocol driver 154, as described above. For example, to register network interface device 140, instructions 122 may register attributes associated with the network interface device 140 (as described above), register port attributes associated with a port of network interface device 140 (as described above), or both. In other examples, instructions 122 may register another network interface device different than network interface device 140 (as described above).

At 310, instructions 124, when executed by the at least one processing resource 110, may provide, to the storage network device, a state change registration 186 specifying when to notify computing device 102 of network changes, as described above. In such examples, instructions 124 may provide the state change registration 186 to the storage network device via network interface device driver 130 and independent of storage initiator 150 and storage protocol driver 154 included in storage initiator 150, as described above.

At 315, instructions 126, when executed by the at least one processing resource 110, may acquire login information 188 for a plurality of storage targets registered with the storage networking repository from the remote storage networking repository via network interface device driver 130, and independent of storage initiator 150 and storage protocol driver 154 included in storage initiator 150, as described above.

At 320, in response to acquisition of the login information 188, instructions 128, when executed by the at least one processing resource 110, may instruct the storage initiator 150 to log in to the plurality of storage targets using the acquired login information 188. In examples described herein in relation to FIG. 3, instructions may be described as performing communication independent of storage initiator 150 and storage protocol driver 154 included in storage initiator 150. In other examples, the instructions may perform those communications independent of storage initiator 150 and any storage protocol driver included in storage initiator 150 or useable as an interface between storage initiator 150 and network interface device 140.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1, 2, and 4.

Figure 4:
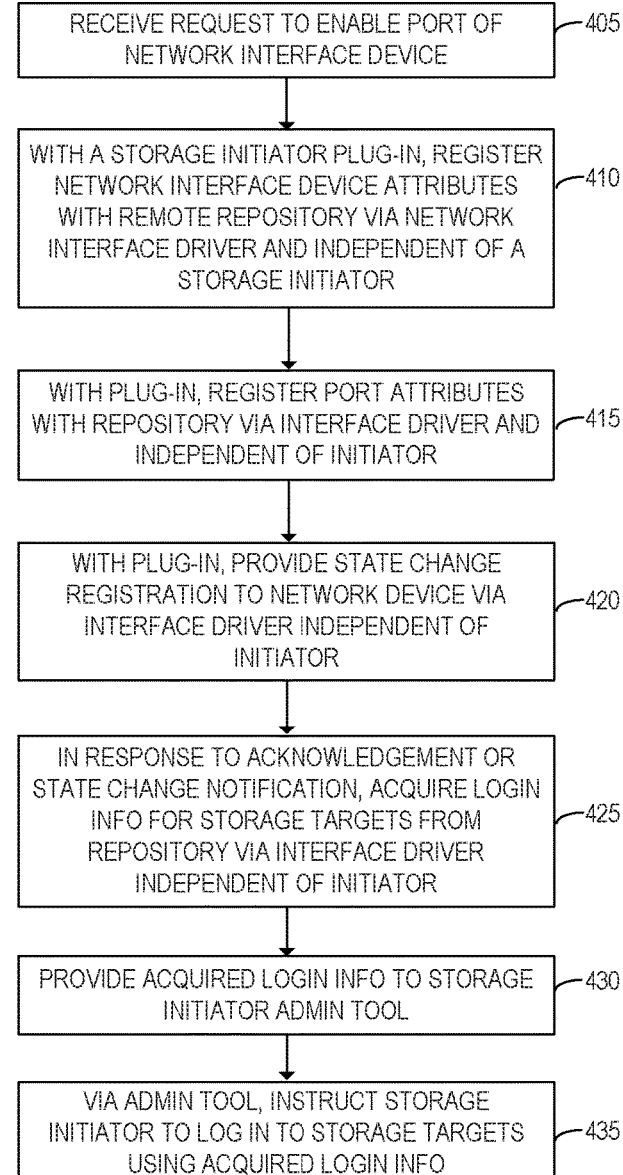
FIG. 4 is a flowchart of an example method of a computing system including registering computing device and port attributes with a storage networking repository, each independent of a storage initiator.

FIG. 4 is a flowchart of an example method 400 of a computing system including registering computing device and port attributes with a storage networking repository, each independent of a storage initiator. Although execution of method 400 is described below with reference to computing system 100 of FIG. 1, other suitable systems for the execution of method 400 may be utilized (e.g., computing system 200 of FIG. 2). Additionally, implementation of method 400 is not limited to such examples.

In some examples, a storage initiator plug-in application separate from a storage initiator of a computing device may implement method 400. For example, the plug-in application may be implemented by instructions 121 (e.g., including instructions 122, 124, 126, and 128) of computing device 102 of FIG. 1, and the instructions implementing the plug-in may be executable by at least one processing resource 110 of computing device 102. In such examples, instructions 121

(including instructions 122, 124, 126, and 128), when executed by the at least one processing resource 110, may perform method 400, as described below. In some examples, the plug-in application may be separate from a storage initiator 150 of computing device 102 and may supplement the functionalities of the storage initiator 150.

At 405 of method 400, instructions 122 may receive a request to enable a specified port (e.g., an Ethernet port) of network interface device 140. For example, instructions 122 may receive the request via a command line utility implemented by instructions 121, as described above.

In response to receiving the request to enable the port, instructions 122 may register network interface device 140 with storage networking repository. For example, at 410, in response to receiving the request to enable the port, instructions 122 may register attributes of network interface device 140 with the storage networking repository via network interface device driver 130 and independent of storage initiator 150 and storage protocol driver 154 included in storage initiator 150, as described above.

In response to an acknowledgement from the storage network device that the computing device attributes are registered with the storage networking repository, at 415 instructions 122 may register port attributes of the specified port of network interface device 140 with the storage networking repository, via network interface device driver 130 and independent of storage initiator 150 and storage protocol driver 154 included in storage initiator 150, as described above. In other examples, instructions 122 may register attributes associated with another network interface device different than network interface device 140 (as described above).

In response to an acknowledgement from the storage network device that the port attributes are registered with the storage networking repository, at 420 instructions 124 may provide, to the storage network device, a state change registration 186 specifying when to notify computing device 102 of network changes, as described above. In such examples, instructions 124 may provide the state change registration 186 to the storage network device via network interface device driver 130 and independent of storage initiator 150 and storage protocol driver 154 included in storage initiator 150, as described above.

At 425, in response to either of acquiring an acknowledgement of the state change registration 186 from the storage network device or acquiring a state change notification from the storage network device (based on the state change registration 186), instructions 126 may acquire login information 188 for a plurality of storage targets registered with the storage networking repository from the remote storage networking repository via network interface device driver 130, and independent of storage initiator 150 and storage protocol driver 154 included in storage initiator 150, as described above.

In response to acquisition of the login information 188, instructions 128 may provide the acquired login information 188 to an administrative tool of the storage initiator at 430, and may, via the administrative tool, instruct storage initiator 150 to log in to the storage targets using the provided login information 188, as described above, at 435. In examples described herein in relation to FIG. 4, instructions may be described as performing communication independent of storage initiator 150 and storage protocol driver 154 included in storage initiator 150. In other examples, the instructions may perform those communications independent of storage initiator 150 and any storage protocol driver included in storage initiator 150 or useable as an interface between storage initiator 150 and network interface device 140.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by at least one processing resource of a computing device comprising a network interface device and a storage initiator associated with a storage protocol driver, the instructions executable to:
   via a network interface device driver to operate the network interface device, and independent of the storage initiator and the storage protocol driver:
      register interface attributes with a storage networking repository of a storage network device remote from the computing device;
      provide, to the storage network device including the storage networking repository, a state change registration specifying when to notify the computing device of network changes; and
      acquire, from the remote storage networking repository, login information for a plurality of storage targets registered with the storage networking repository;
      wherein the instructions are executable to register the interface attributes, provide the state change registration, and acquire the login information, each while the storage initiator is not logged in to any storage target; and
   in response to acquisition of the login information, provide the login information to the storage initiator and instruct the storage initiator to log in to the plurality of storage targets using the login information.

2. The article of claim 1, wherein the instructions are executable to register the interface attributes and acquire the login information via the network interface device driver for the network interface device, and independent of any storage protocol driver of the storage initiator useable as an interface between the storage initiator and the network interface device.

3. The article of claim 2, wherein:
   the network interface device is a network interface controller (NIC);
   the network interface device driver is a NIC driver to control the NIC;
   the storage initiator is an Internet Small Computer Systems Interface (iSCSI) initiator; and
   the storage protocol driver comprises an iSCSI driver of the iSCSI initiator.

4. The article of claim 1, wherein the instructions to provide the login information to the storage initiator and instruct the storage initiator to log in comprise instructions to:

provide the login information to an administrative tool of the storage initiator and instruct the administrative tool of the storage initiator to log in to the storage targets using the login information.

5. The article of claim 1, wherein the instructions are included in a plug-in executable in kernel space of the computing device.

6. The article of claim 1, wherein the instructions are included in a plug-in executable in user space of the computing device.

7. The article of claim 6, wherein the instructions are executable to:
receive, via a command line utility of the plug-in, a request to enable a port of the network interface device; and
in response to the request to enable the port, register the interface attributes, provide the state change registration, and acquire the login information.

8. A computing device comprising:
a network interface device;
a network interface device driver;
a storage initiator including a storage protocol driver separate from the network interface device driver and to interface between the storage initiator and the network interface device;
at least one processing resource; and
at least one non-transitory machine-readable storage medium comprising instructions executable by the at least one processing resource to:
via a network interface device driver to operate the network interface device, independent of the storage initiator and the storage protocol driver, and before the storage initiator is logged in to any storage target:
register the network interface device with a storage networking repository of a storage network device remote from the computing device;
provide, to the storage network device implementing the storage networking repository, a state change registration specifying when to notify the computing device of network changes; and
acquire, from the remote storage networking repository, login information for a plurality of storage targets registered with the storage networking repository;
wherein the instructions are executable to register the interface attributes, provide the state change registration, and acquire the login information, each while the storage initiator is not logged in to any storage target; and
in response to acquisition of the login information, provide the login information to the storage initiator and instruct the storage initiator to log in to the plurality of storage targets using the login information.

9. The computing device of claim 8, wherein:
the instructions are executable to register the network interface device with the storage networking repository, provide the state change registration to the storage networking repository, and acquire the login information from the storage networking repository, each using at least one link layer discovery protocol (LLDP) frame communicated via the network interface device driver and without using the storage initiator or the storage protocol driver of the storage initiator.

10. The computing device of claim 8, wherein:
the storage network device is a network switch remote from the computing device, the network switch comprising the storage networking repository.

11. The computing device of claim 8, wherein the instructions to register the network interface device comprise instructions executable to:
register attributes associated with the network interface device with the storage networking repository, via the network interface device driver and independent of the storage initiator and any storage protocol driver of the storage initiator; and
in response to an acknowledgement from the storage network device that the attributes associated with the network interface device are registered with the storage networking repository, register port attributes of a port of the network interface device with the storage networking repository, via the network interface device driver and independent of the storage initiator and any storage protocol driver of the storage initiator.

12. The computing device of claim 11, wherein:
the instructions to provide the state change registration comprise instructions executable to, in response to an acknowledgement from the storage network device that the port attributes are registered with the storage networking repository, provide the state change registration to the storage networking repository via the network interface device driver and independent of the storage initiator and any storage protocol driver of the storage initiator; and
the instructions to acquire the login information are to acquire the login information for the plurality of storage targets in response to either of acquiring an acknowledgement of the state change registration from the storage network device or acquiring a state change notification from the storage network device.

13. The computing device of claim 8, wherein the instructions to register comprise instructions to:
via the network interface device driver and independent of the storage initiator, register, with the storage networking repository, attributes of the network interface device and a client type attribute to indicate whether the computing device including the network interface device is a storage network control node.

14. The computing device of claim 8, wherein the instructions to register comprise instructions to:
via the network interface device driver and independent of the storage initiator, register port attributes of a port of the network interface device, the port attributes including at least one of a priority level, data center bridging capabilities exchange protocol (DCBX) support information, a quality of service support level, or a security support level.

15. A method of a storage initiator plug-in application separate from a storage initiator of a computing device, the plug-in application executable by at least one processing resource of the computing device, the method comprising:
with the at least one processing resource executing the storage initiator plug-in application, registering a network interface device of the computing device with a storage networking repository of a storage network device remote from the computing device, wherein the registering is via a network interface device driver to operate the network interface device and independent of a storage initiator including a storage protocol driver;

with the at least one processing resource executing the storage initiator plug-in application, providing, to the storage network device implementing the storage networking repository, a state change registration specifying when to notify the computing device of network changes, wherein the state change registration is provided via the network interface device driver and independent of the storage initiator;

with the at least one processing resource executing the storage initiator plug-in application, acquiring login information for a plurality of storage targets registered with the storage networking repository from the remote storage networking repository via the network interface device driver and independent of the storage initiator;

wherein the registering the interface attributes, the providing the state change registration, and the acquiring the login information are each performed by the at least one processing resource executing the storage initiator plug-in application while the storage initiator is not logged in to any storage target; and in response to acquisition of the login information, instructing the storage initiator to log in to the plurality of storage targets using the acquired login information.

16. The method of claim 15, further comprising:

receiving a request to enable an Ethernet port of the network interface device;

wherein the registering the network interface device with the storage networking repository is in response to receiving the request to enable the Ethernet port.

17. The method of claim 16, wherein the registering the network interface device comprises:

registering attributes of the network interface device with the storage networking repository, via the network interface device driver and independent of the storage initiator and any storage protocol driver of the storage initiator; and in response to an acknowledgement from the storage network device that the network interface device attributes are registered with the storage networking repository, registering port attributes of a port of the network interface device with the storage networking repository, via the network interface device driver and independent of the storage initiator and any storage protocol driver of the storage initiator.

18. The method of claim 17, wherein:

the providing the state change registration is in response to an acknowledgement from the storage network device that the port attributes are registered with the storage networking repository;

the acquiring the login information is in response to either of acquiring an acknowledgement of the state change registration from the storage network device or acquiring a state change notification from the storage network device; and the instructing the storage initiator to log in to the storage targets comprises providing the acquired login information to an administrative tool of the storage initiator and, via the administrative tool, instructing the storage initiator to log in to the storage targets using the provided login information.

* * * * *